Nov. 23, 1965  T. GASTON ETAL  3,218,988

MONO CABLE TRANSPORTING DEVICE

Filed Nov. 15, 1962  6 Sheets-Sheet 2

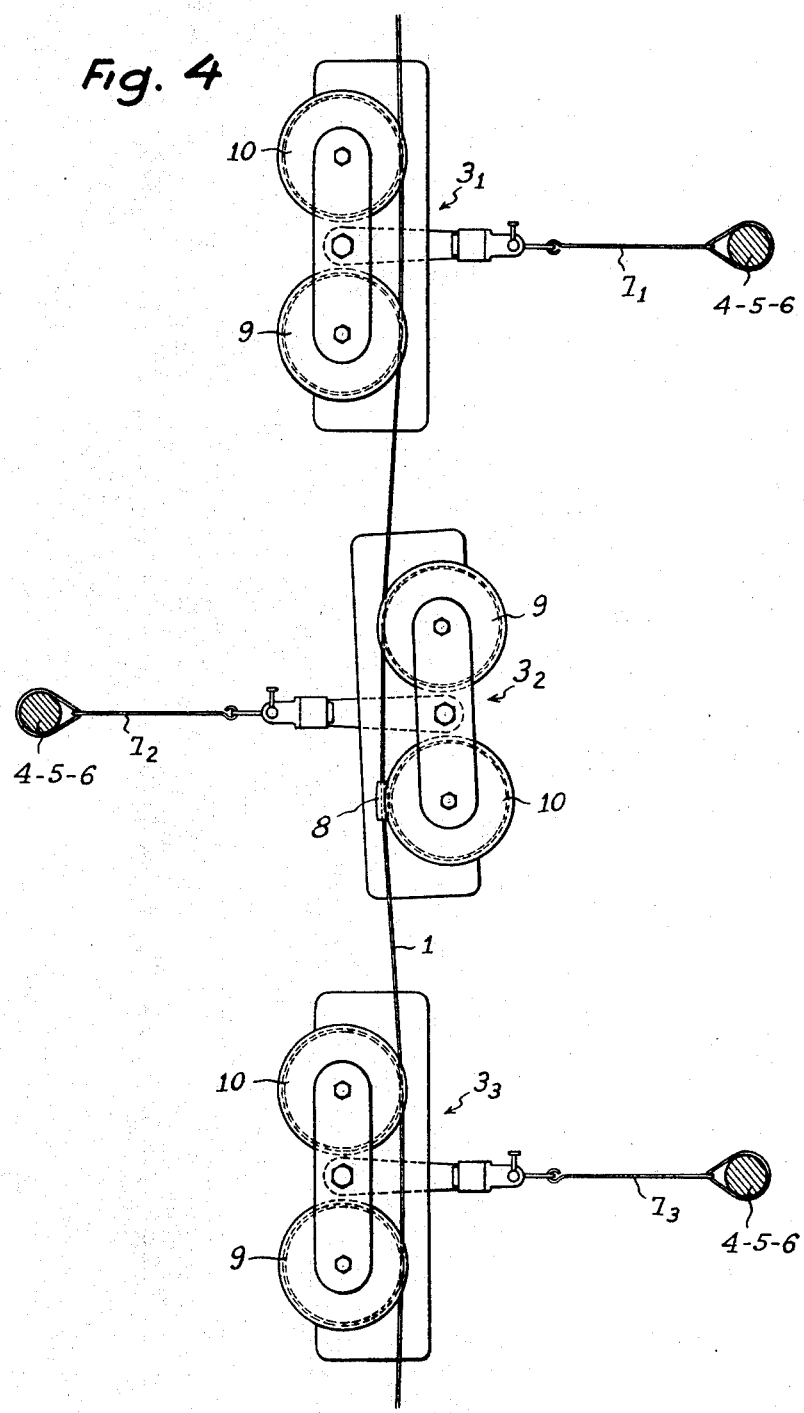

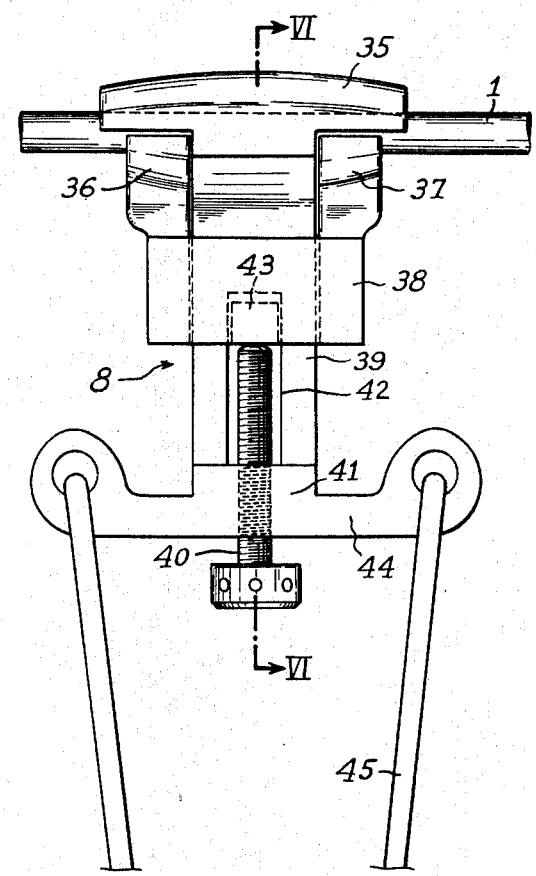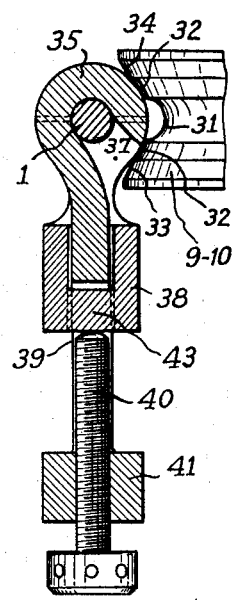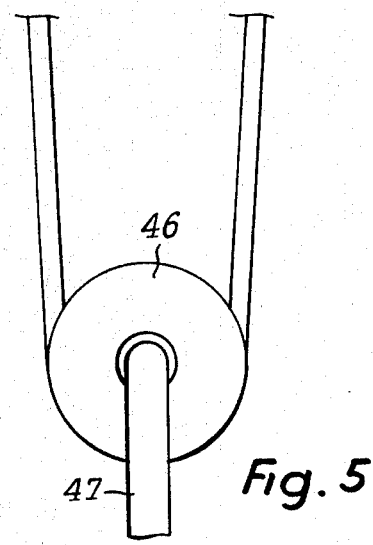
Fig. 6
Fig. 5

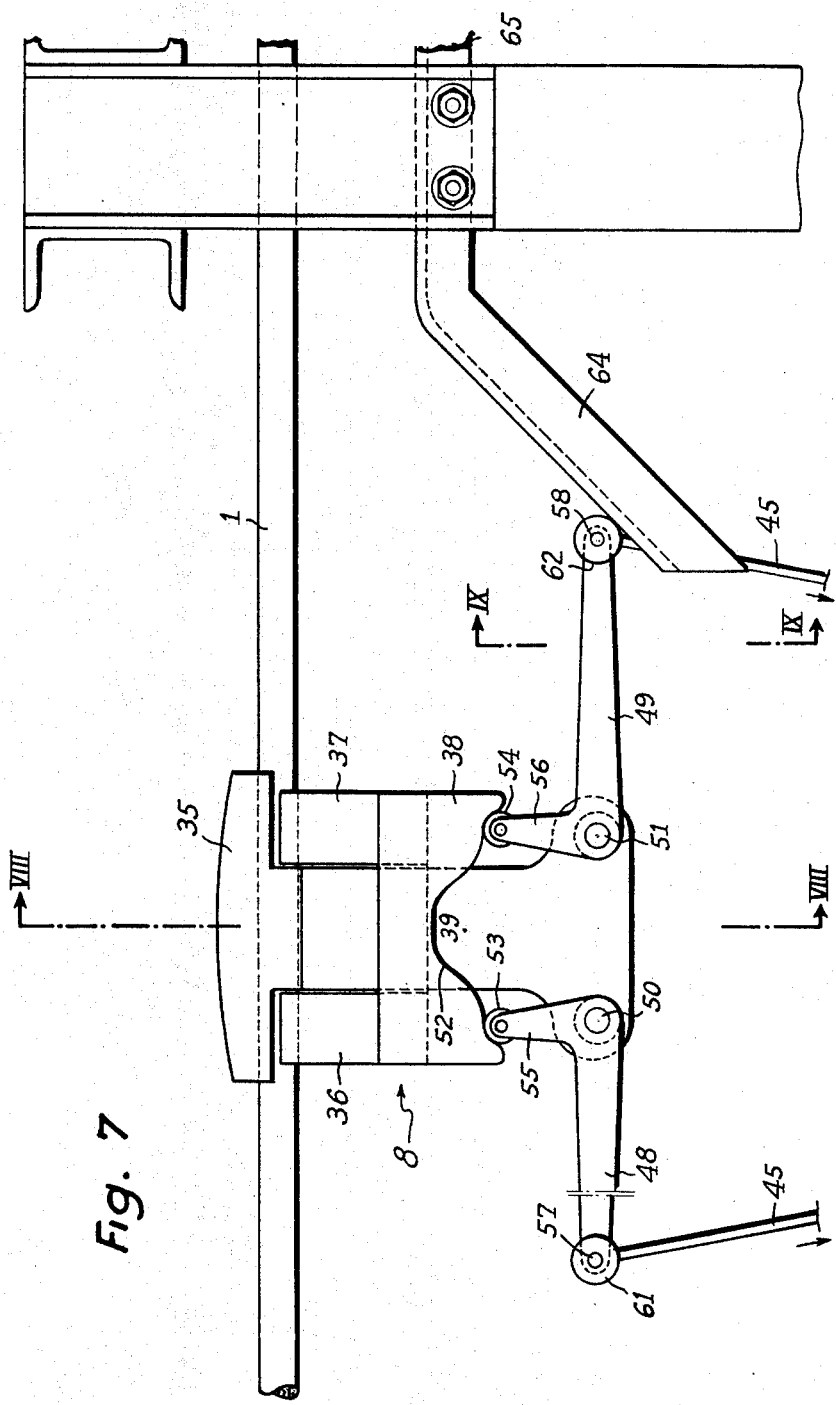

United States Patent Office 3,218,988
Patented Nov. 23, 1965

3,218,988
MONO CABLE TRANSPORTING DEVICE
Théophile Gaston and Aimé Gaston, both of Route de Toulouse, Saint-Lizier, Ariege, France
Filed Nov. 15, 1962, Ser. No. 237,916
Claims priority, application France, Nov. 18, 1961, 462; Feb. 17, 1962, 465
12 Claims. (Cl. 104—191)

The present invention relates to a novel mono cable transporting device which may be put into operation in any known kind of teleferic installation, such as teleferic systems having cabins or cages, chair lifts, passenger tows, etc., which are usually set up over hilly or mountainous ground, and in overhead systems provided for industrial and commercial installations or for factories, shops, warehouses, etc.

One particularly useful application of this mono cable transporting device is for the transportation of felled timber in mountainous districts. In the past, such an operation has often necessitated the temporary installation of teleferic assemblies such as those known as tri-cable installations, cable cranes referred to in the industry as being of the "Blondin type" (which type will be described below), cable cranes equipped with cable-gripping stops (which will also be described below), and continuous cables. It should be understood, however, that the present invention is not limited to this particular application.

The tri-cable which is referred to as being of the German variety is the one most generally used for operations of the above described type and comprises two carrying cables and an endless traction cable linking a plurality of trolleys. This system has the advantage of being extremely simple and employs only robust elements. Moreover, in most cases it is moved simply by gravity. However, this device has the drawback of being unversatile in use; i.e., it can serve the function of a road, but it is generally incapable of being unloaded on the same mountainous terrain as that on which the timber is felled and may therefore be used only in cases where it can clear this timber completely out of the felling region.

A cable crane of the "Blondin type" is characterized in that it comprises one or more carrying cables from which is suspended a trolley linked to a multiple cable device adapted to control the trolley's displacement. A cable crane equipped with cable-gripping stops is characterized in that it comprises the same elements as the Blondin type crane except that one of the cables for effecting movement is omitted since the trolley is moved in one direction by gravity and in the other direction by the motion of one of the cables to which it is connected by cable-gripping stops. Cable cranes of these types have the advantage of permitting simple unloading and generally enable the woodland to be protected from unnecessary damage due to the felling operations, but present the drawback of only being useful as an alternative to other systems since they can only be economically installed to carry timber over short distances not exceeding a few hundred meters.

The tri-cable and the cable crane are mutually complementary but in general neither can solve separately all of the problems involved in the transportation of felled timber in rough country.

The continuous cable, or "English" cable, is a traction and carrying cable from which the loads are suspended. Existing embodiments of this type of cable are only capable of carrying light single loads. However, these devices present the advantages of allowing the timber to be transported over distances of several kilometers and to be easily unloaded. This type is, in effect, sufficiently versatile to be set up over the terrain upon which the timber is felled and consequently permits a reduction to a minimum of the distance which the felled timber must be carried before being attached to the cable system. This system also eliminates the need for transferring the load from one device to another, as occurs when the tri-cable and cable crane are used together. Such a continuous cable has only hitherto been useful for the exploitation of scrap wood, such as that used for firewood or for the making of cellulose, with each piece of wood being separately hitched and unhitched, because of the low permissible load per unit length which the system can support. Moreover, this system requires a large crew to place it into operation.

The present invention relates to a mono cable transporting device which combines the advantages of the various teleferic installations referred to above while minimizing their drawbacks. In effect, the transporting device of this invention presents a great flexibility in use since its path can be close to the ground, its curves may be to the left and/or to the right, its slopes may rise or fall, and its path may be modified during the period of its use in order to permit it to always be in proximity to the region in which timber is being cut. Its assembly is easy and rapid, and can be carried out by a small number of relatively unskilled workmen. Finally, with the apparatus of the present invention, only one single installation is necessary for carrying out both the loading and the transporting of all the products of a normal timber felling operation in a mountainous region.

In accordance with this invention, the transporting device comprises a single traction carrying cable and is characterized by the fact that the grooved pulleys necessary for supporting the cable, at least along the curves of its path, are disposed substantially in the plane of, and on the concave side of, these curves and are mounted in floating fashion at the end of inextensible elements placed under longitudinal tension at the time of the setting up of the cable, said inextensible elements being freely articulated on supports located on the convex side of said curves. The term "floating fashion" is here intended to describe the ability of the pulleys to automatically assume any angular orientation in response to the pull exerted by the cable in such a manner as to maintain the plane of bilateral symmetry of the pulley groove coplanar with the plane defined by the longitudinal axis of the cable portion supported by said pulley. The term "freely articulated" is intended to define the ability of the inextensible elements, which may be merely rigid rods, to pivot in any sense with respect to their supports, said supports being stationary. The system also comprises load carrying members for hooking or for otherwise securing loads onto the cable, said members having a profile or shape which cooperates with the grooves of the pulleys and also constituting intermediate supports for the cable when the cable is freed from a pulley. These load carrying members act as "intermediate supports" in that, at the time when one of said load carrying members passes over a pulley, it engages a pulley groove specially provided for it and in turn functions as the actual cable support.

Certain other characteristics of the invention will become apparent from the following description.

Some embodiments of the invention are shown by way of non-limiting example in the enclosed drawings, in which:

FIGURE 4 is a partial bottom plan view illustrating to

FIGURE 5 shows an elevation view of a first embodiment of a member for hooking a load onto the cable.

FIGURE 6 shows a section along the line VI—VI of FIGURE 5.

FIGURE 7 is a view similar to that of FIGURE 5 showing a second embodiment of a hooking member.

Figure 1:
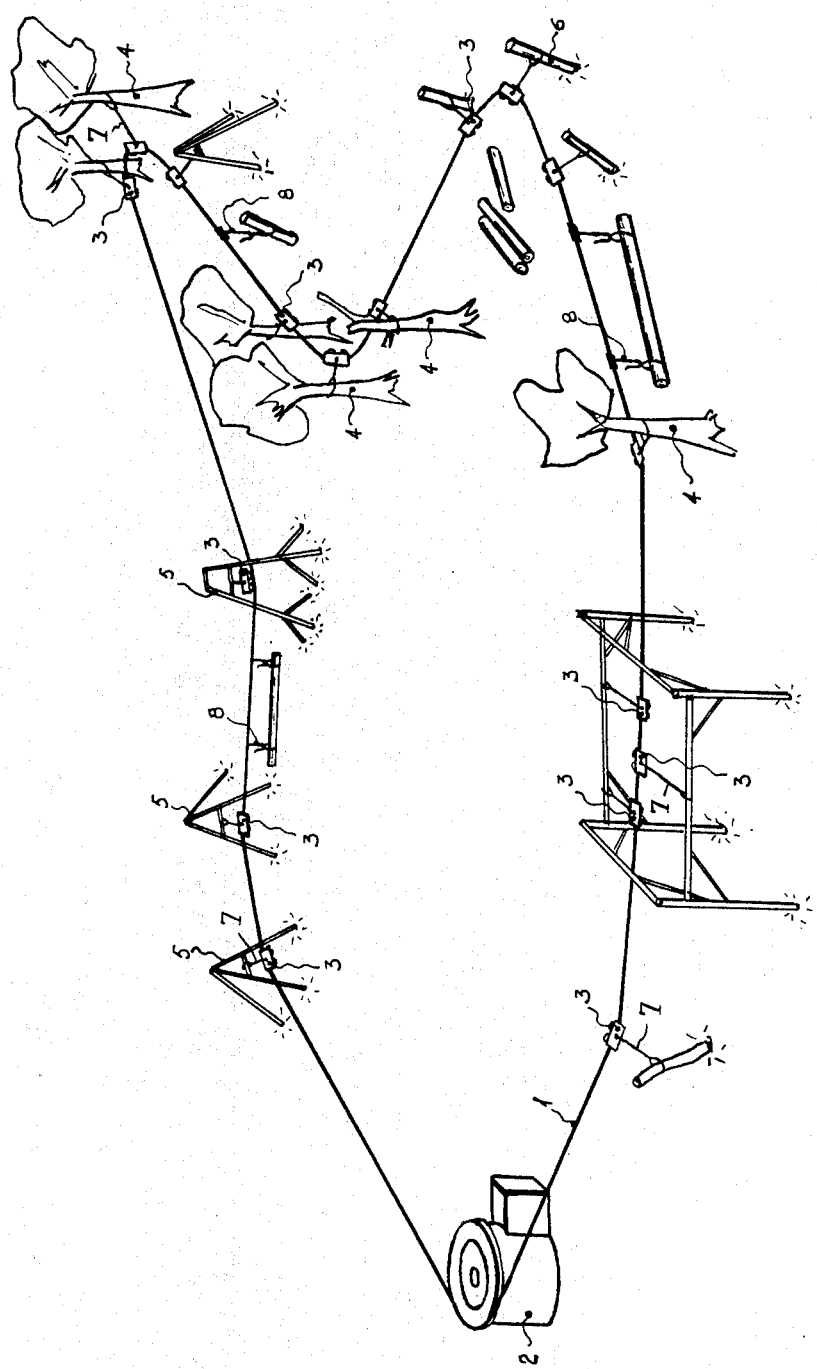
FIGURE 1 shows a perspective view illustrating in operation a teleferic installation embodying the mono-cable transporting device of the invention.

Referring now to the drawings, as is shown clearly in FIGURE 1, the transporting device comprises a continuous i.e. endless traction carrying cable 1 engaged over a driving pulley at a control station 2 which may be of a known type and which may be motorised and/or provided with braking means, said station being linked to a mechanism for placing the cable under tension. In order to allow the cable 1 to follow a path which is close to the ground and which passes close to the locations for loading and unloading several supporting pulley arrangements 3 are provided for allowing the said cable to be guided and supported along curves having horizontal and/or vertical components and along straight lines when the loads are relatively large or the straight portions of the cable path are relatively long. These support pulley arrangements 3 are secured to supports which may be of any desired type, for example, they may be natural supports such as trees 4 or rocks or other natural objects, or artificial supports, such as tripods 5 or pylons, poles, or stakes 6 and so on. Each arrangement 3 is connected to the support most appropriate to its situation by a tie member 7 which may comprise a cable, a chain, an articulated bar, or a closed ring or the like.

Hook, or load carrying, members 8 for attaching a load are secured permanently or temporarily and with a fixed or variable spacing, as required, to the traction carrying cable 1.

Figure 2:
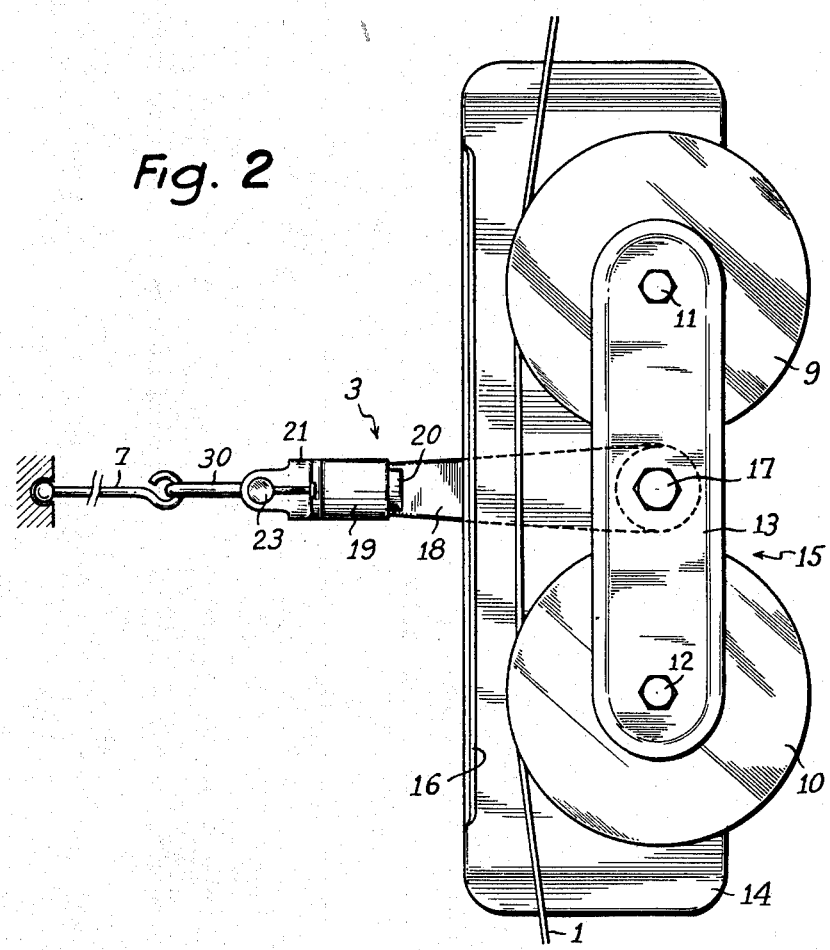
FIGURE 2 shows a bottom plan view of one of the support elements for the transport cable.
Figure 3:
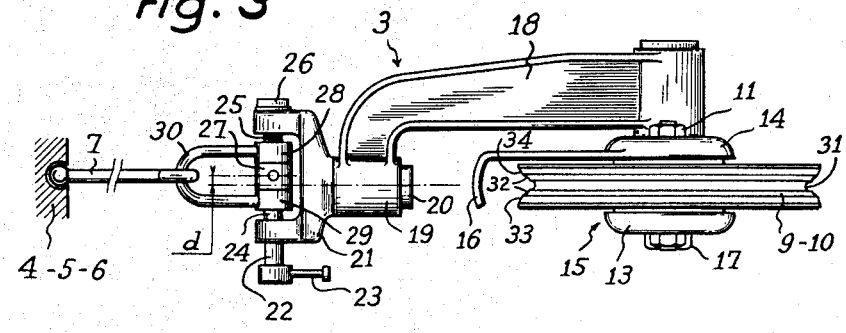
FIGURE 3 shows a side view of the element of FIGURE 2.

In accordance with the invention, and as will be particularly seen in FIGURES 1 to 3, each support arrangement 3 for the cable 1 comprises at least one grooved pulley which, when it is required to support the cable in the vicinity of the curved portions of its path, is disposed substantially in the plane of the curve on the concave side thereof. This pulley is mounted in a floating fashion at the end of an inextensible tie member placed under longitudinal tension when the cable is positioned or set up, and pivotally joined to a support 4, 5 or 6 situated on the convex side of said curve.

Thus, under the combined effects of the tension on the cable 1 (created by the tensioning mechanism co-operating with the station 2) and the tension on the tie member 7 (created by the cable itself and/or by a device (not shown), associated with the tie member), each support member 3 is in a state of stable equilibrium and effectively supports the cable 1 whatever be the forces to which the system under consideration is subjected (i.e. actual weight of the support member, weight of the cable distributed on this support, weight of the moving load transported by the cable, and tensions on the latter on the tie member 7). This equilibrium is stable since at the time of the passage of a moving load past the support arrangement, there is produced a small lowering or dip of the said support arrangement which pivots towards the ground and a tilting of the pulley axis of rotation away from the vertical, which actions tend to engage the cable more firmly in the pulley and consequently to increase the tensions on the said cable and the said tie member.

FIGURES 2 and 3 show a preferred embodiment of a supporting member 3 which, however, is not to be considered in any way limiting of the form which this member may take. This member comprise two pulleys 9 and 10 which are loosely mounted on tapered roller bearings on spindles 11 and 12 integral with two cheek plates 13 and 14 constituting a rocking link plate 15. The cheek plate 14 is located above the cable and is provided with a lip 16 which facilitates the mounting, and placing under tension, of the cable in the arrangement 3. The link plate 15 is pivotally mounted in overhanging fashion on a spindle 17 which has projecting at one of its ends a rigid arm 18, normally extending above and across the cable 1. At its free end the arm 18 is integral with a sleeve 19, the longitudinal axis of which is located in the median plane of the pulleys 9 and 10 and perpendicular to the longitudinal axis of spindle 17. This sleeve supports, by means of a plummer block and a turning stop, a tail 20 extending from a yoke 21 having a rod 22. The latter extends in a direction perpendicular to that of the tail and forms an articulation axis for the free end of the tie member 7. The means used for connecting the tie member to the arm 18 is constituted by a Cardan, or universal, joint having two degrees of movement (i.e. loop 30 is free to rotate about a horizontal axis with respect to tie member 7 and eye pieces 28 and 29 can rotate with respect to collar 27 about an axis perpendicular to said horizontal axis). It may thus be considered that the support arrangement 3 is mounted in a floating fashion at the end of the tie member, which is itself articulated on a support, and consequently that this support arrangement orients itself automatically under the effect of the loads to which it is submitted, in the plane of the loop described by cable 1. Moreover, the fact that the tie member 7 is connected to its support by means of a semi-articulation (an anchoring ring for example) and that the link plate 15 is pivotable allows the said support arrangement to adapt, within wide limits, to the varying orientations of the cable loop.

The rod 22, which is provided with a control member 23, is cylindrical. At one of its ends 24 it is smooth and guided longitudinally in one of the limbs of the yoke 21, and at its other end 25 it is screw-threaded and co-operates with a screwed part of the other limb of said yoke, a lock screw also being provided.

At its median zone, the rod 22 has a collar 27 interposed between two eye pieces 28 and 29 formed at the ends of a loop 30 to which the tie member 7 is joined. The Cardan joint means for connecting the rod 22 to the tie member 7 comprises a means for adjusting the point of attachment of the tie member, this means determining the distance $d$ from the attachment point to the plane of the grooves of the pulleys 9 and 10. This adjustment means is particularly advantageous because should the cable diameter vary from its intended value, thus preventing its axis from coinciding with the median plane of pulley groove 31, or should there be dimensional variations from one support arrangement 3 to another, distance $d$ may be adjusted to correct for these variations and to bring the resultant of the forces acting on arrangement 3 into alignment with the axis of tie member 7.

FIGURES 1 and 4 show that in order to support the cable along its straight line path, three support arrangements $3_1$, $3_2$ and $3_3$ are provided on one or more supports. Pulleys 9 and 10 of the intermediate supporting arrangement $3_2$ are located on one side of the cable whilst the pulleys 9 and 10 of the outer arangements $3_1$ and $3_3$ are located on the other side of the cable. The tie members $7_1$, $7_2$, $7_3$ associated with the said supporting arrangements are arranged as described above and when they are placed under tension this gives to the cable 1 a slightly sinuous shape. This arrangement permits the system thus set up for a straight line to be in stable equilibrium.

FIGURES 3 and 6 show that each pulley 9 and 10 of supporting arrangement 3 has two tiered grooves 31 and 32 set in from the lateral entry ramps 33 and 34; the median and deeper groove 31 is intended for guiding and supporting the cable 1 whilst the widened peripheral groove 32 is provided for guiding and supporting the load hooking members.

Thus, when a load hooking member passes by, and is engaged in, a pulley, the cable portion adjacent the pulley is freed therefrom and the hooking member acts as a temporary intermediate cable support element.

The load hooking members 8, whether they be permanently or detachably secured to the cable, each has a cable-surrounding portion shaped in the form of a spindle whose longitudinal axis is coaxial with the axis of the cable-portion which it encloses. The spindle is mounted so as to be freely rotatable, with respect to the load which it supports, about an axis perpendicular to its longitudinal axis. The spindle is shaped to fit into the widened peripheral grooves 32 of pulleys 9 and 10 when it passes by the latter.

During the periods when they engage the pulleys, the hooking members may remain substantially vertical or slightly inclined with respect to the vertical. This orientation of the hooking member is determined by the thickness of their pulley-engaging portions in relation to the clearness of pulleys 9 and 10.

Each hooking member is constituted by a pincer which comprises both a fixed jaw 35 shaped like a hook and supported from cable 1 and two movable jaws 36 and 37 located to either side of the fixed jaw 35. The jaws 35 to 37 define semi-cylindrical channels abutting on a plane of the joint corresponding to a plane of symmetry of the cable 1. Moreover, these jaws 35 to 37 are profiled so that their common outer shape may be combined to form the above-described spindle and thus to fit into the grooves 32 of the pulleys.

Moreover, jaws 36 and 37 are integral with a slider 38 in the form of a frame which is screwed to a guiding adjuster 39 forming a downwardly-directed extension of the fixed jaw 35. The slider 38 is linked to a pressing device tending to apply the cable 1 against the said fixed jaw 35 by the application of an upward pressure against moving jaws 36 and 37. Two embodiments of this pressing device are given by way of example in the description to follow.

In accordance with the first embodiment which is illustrated in FIGURES 5 and 6, the pressing device comprises a manual locking member cooperating with the fixed jaw of the pincer. The locking member may comprise a screw 40 co-operating with a threaded boss 41 of the fixed jaw guiding adjuster 39. The screw 40 passes through an opening 42 of the adjuster 39 and its free end is applied against a block 43 which is integral with the slider 38, block 43 being located in the opening 42, Thus, by turning the screw 40 in one direction or the other, the moving jaws 36 and 37 are brought towards or away from the fixed jaw 35 whereby the cable 1 is locked or unlocked. Each pincer 8 is provided with a pendulous suspending device for supporting the load to be carried. In the embodiments considered in FIGURES 5 and 6 the adjuster 39 of the fixed jaw 35 is integral with a cross arm 44 upon which the two ends of cable 45 are hooked. The cable 45 forms a loop in which is located a groove pulley 46 upon the axis of which is fixed a load hooking member 47 (such as a hook, for example). This pulley, by rolling on the cable 45 tends to cause the load to remain directly beneath the pincer.

Figure 8:
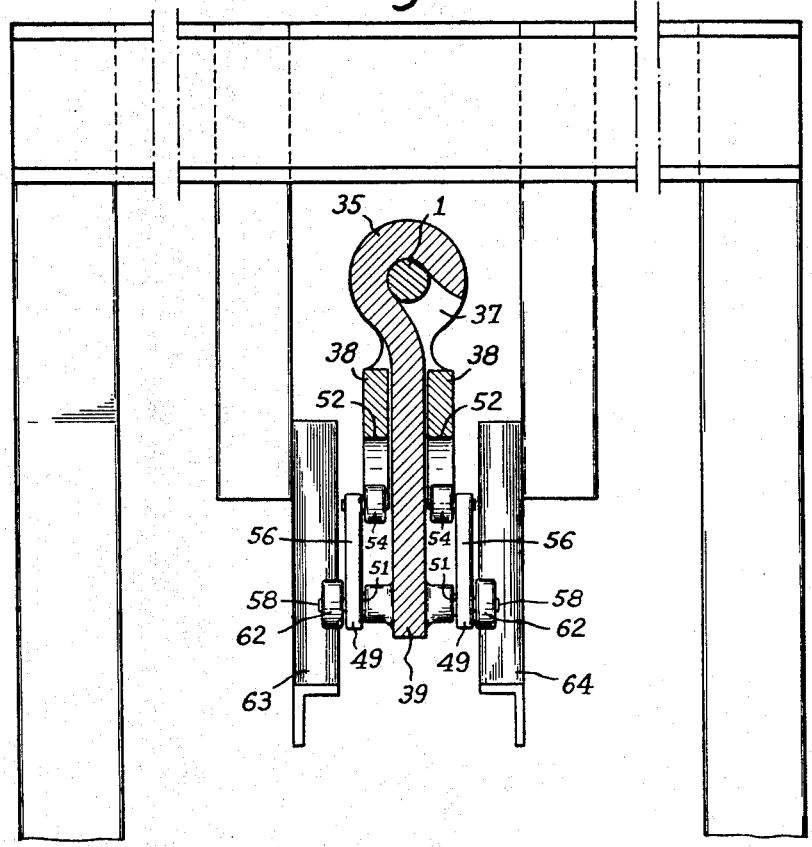
FIGURES 8 and 9 are cross-sections taken respectively along the lines VIII—VIII and IX—IX of FIGURE 7.
Figure 9:
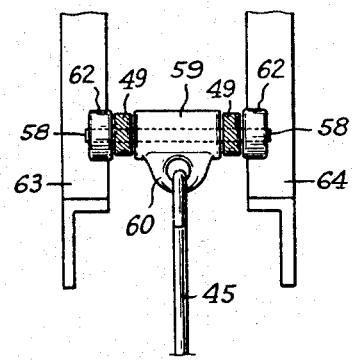

In accordance with the second embodiment illustrated in FIGURES 7 to 9, the pressing device interconnecting the moving jaws 36 and 37 of each pincer is automatic and is constituted by an operating member sensitive to the weight of the load and interposed between the said moving jaws and the fixed jaw 35. The operating member may be constituted by a double-acting jack, the supply feed to which is in a closed circuit and controlled by a distributor directly controlled by the load. But in the example shown, the aforementioned operating member comprises two pairs of levers 48 and 49 symmetrically disposed about a plane perpendicular to the cable 1 and situated at an equal distance from the moving jaws 36 and 37. These levers 48 and 49 are mounted to pivot about articulation axes 50 and 51 integral with guiding adjuster 39 of the fixed jaw 35; the levers are placed in contact with the slider 38, which is integral with the moving jaws 36 and 37, by means of profiled cams. The cams may be formed directly by the levers 48 and 49 and applied against a rectilinear lower edge of the slider 38. But it may be advantageous, as is shown in the drawing, that a profile cam 52 be formed symmetrically about the aforesaid plane on the slider 38 itself, in such a way as to co-operate with loose or free rollers 53 and 54 carried by extensions 55 and 56 oriented substantially at right angles to the said levers 48 and 49. Thus, when these levers pivot towards the ground, the shape of the cam profile 52 causes the moving jaws 36 and 37 to approach the fixed jaw 35, and vice versa.

From FIGURE 8 it will be seen that two profiles 52 are formed on the slider 38 on either side of the guiding adjuster 39 and that these profiles co-operate with two rollers 53 and two rollers 54 respectively carried by two levers 48 and two levers 49. At their free end the levers 48 are connected by a shaft 57 and the levers 49 are connected by a shaft 58. On these shafts are screwed rings or collars 59 provided with attachment pieces 60 for fixing the load suspension cable 45. Upon these shafts 57 and 58 are respectively freely mounted two rollers 61 and two rollers 62, situated outside the space occupied by the assembly 8. The rollers 61 and 62 are intended to co-operate with inclined ascending ramps 63 and 64 secured to a support at a discharge station.

As a result of the construction described, on the one hand, under the effect of the load carried, the levers 48 and 49 tend to pivot towards the ground and consequently cause the jaws 35 to 37 to be locked together, and on the other hand, under the effect of the lifting action of the ascending ramps 63 and 64, these levers 38 and 39 tend to pivot in an upward direction and consequently to free the moving jaws 36 and 37 of the pincer. In the latter case, the pincer detaches itself from the cable 1 and the load is no longer supported by the cable, but by the assembly 8 itself whose rollers 61 and 62 rest on rails 65 forming extensions of the ramps 63 and 64.

It will be understood that the invention has been described only by way of example, and that various modifications may be made to the specific details hereinbefore referred to without departing from its scope as defined by the appended claims.

We claim:
1. A transporting device comprising a single traction-carrier cable, a system of grooved pulleys for supporting said cable, at least in the curves of its path, and arranged substantially in the plane of said curves on the concave side thereof, means for mounting said pulleys at the end of non-extensible members submitted to longitudinal tension at the time of laying the cable, said mounting being in such a manner as to permit each of said pulleys to freely assume whatever angular orientation is required to place the forces acting on said pulley in stable equilibrium, means for pivotally mounting said non-extensible members on supports located on the convex side of said curves, and load carrying members surrounding and immovably gripping said cable for hooking loads to be transported onto said cable, said load carrying members having a section cooperating with the grooves of said pulleys so that said load carrying members, when they engage said pulleys, are supported thereby and in turn directly support said cable.

2. A device as recited in claim 1 wherein said traction carrier cable has a continuous, sinuous path comprising curves having horizontal and vertical components.

3. A device as recited in claim 1 wherein the cable supporting pulleys are grouped in pairs, the pulleys of one of said pairs being loose and supported by a rocking link plate mounted in an overhanging arrangement around a shaft having an arm projecting from the free end thereof, said arm extending above the cable and connected to a corresponding one of said non-extensible members by means of a Cardan joint, said non-extensible member being located substantially in the plane of rotation of the pulleys.

4. A device as recited in claim 3 wherein the non-extensible member associated with the supporting arm of each pair of pulleys is located out of the plane bisecting said pulleys and perpendicular to the axes of rotation thereof, and its distance from the said plane being modifiable by means of an adjustment member linked to said non-extensible member and forming a part of said Cardan joint with which the supporting arm is provided.

5. A device as recited in claim 4 wherein the Cardan joint connecting the supporting arm of each set of pulleys to its corresponding non-extensible member comprises a yoke having a tail extending along said plane in the direction of the shaft around which said link plate is mounted, said arm comprises a sleeve which fits around said tail, said tail terminates in a rotatable stop which prevents it from sliding out of said sleeve while permitting it to rotate therein, said yoke guiding a rod in a direction which is perpendicular to said tail, said rod having a threaded end and said yoke having a threaded opening which cooperates with said threaded rod end so as to permit said rod to be moved longitudinally in said yoke and said adjustment member is mounted on said rod in such a way as to be rotatable about the longitudinal axis of said rod and so as to be immovable in a longitudinal direction relative to said rod.

6. A device as recited in claim 1 wherein said cable is supported along the straight portions of its path by three sets of pulleys arranged so as to cause the cable section adjacent said pulleys to have a slightly sinuous curve, the intermediate one of said three sets of pulleys being located on one side of said cable and the other two sets of pulleys being located on the other side thereof.

7. A device as recited in claim 1 wherein the part of each load carrying member which is fixed to the cable has a circular external cross-section in order to cooperate with the pulleys which, for this purpose, have grooves in two layers, one of said layers being deep to accommodate the cable and the other being tapered for the passage of said load carrying members.

8. A device as recited in claim 1 wherein each of said load carrying members is constituted by gripping members which, on the one hand, comprise a fixed jaw having the shape of a hook and suspended from said cable, said fixed jaw comprising a downwardly directed extension, and, on the other hand, at least one movable jaw guided on said extension of the fixed jaw, a pressing device mounted on said extension and acting on said movable jaw to cause said jaws to tightly grip said cable, and a pendulous sling suspended from said extension for supporting loads to be transported.

9. A device according to claim 8, wherein the pendulous sling connecting a load to each gripping member is constituted by a cable, the ends of which are hooked to said extension in order to form a loop in which a grooved pulley is arranged, a member for hooking the load being fixed to the shaft of said pulley.

10. A device according to claim 8, wherein the pressing device controlling the movable jaw of each gripping member is constituted by a manually operable tightening member resting against the fixed jaw of said gripping member.

11. A device according to claim 8 wherein the pressing device controlling the movable jaw of each gripping member is automatic and constituted by an actuating member located between the two jaws of said gripping member and responsive to the weight of the load.

12. A device according to claim 11, wherein the actuating member located between the two jaws of each gripping member is constituted by two levers articulated on the fixed jaw and caused to come into contact with the movable jaw by means of cam sections, the free ends of these levers supporting, on the one hand, the pendulous load-sling and, on the other hand, bearings for co-operating with inclined lifting ramps located at the discharge position of the transporter.

References Cited by the Examiner

UNITED STATES PATENTS

| | | | |
|---|---|---|---|
| 507,887 | 10/1893 | Dean | 104—217 |
| 548,261 | 10/1895 | Merriam et al. | |
| 783,920 | 2/1905 | Zimmerman | 104—115 |
| 1,430,717 | 10/1922 | Archibald | 104—208 |
| 1,728,611 | 9/1929 | Jennings | 104—180 |
| 3,037,464 | 6/1962 | Penney et al. | 104—209 |

FOREIGN PATENTS

| | | |
|---|---|---|
| 218,955 | 7/1924 | Great Britain. |
| 126,386 | 10/1949 | Sweden. |

MILTON BUCHLER, *Primary Examiner.*

LEO QUACKENBUSH, ARTHUR L. LA POINT,
*Examiners.*